(12) United States Patent
Tripathy et al.

(10) Patent No.: US 12,450,074 B2
(45) Date of Patent: Oct. 21, 2025

(54) COMPILER AND RECOMMENDATION ENGINE FOR MULTI-CONDITION WORKFLOW CONFIGURATION

(71) Applicant: INTUIT INC., Mountain View, CA (US)

(72) Inventors: Shyamalendu Tripathy, Bangalore (IN); Harsh Kriplani, Rajasthan (IN); Bhavishya Tolani, Bangalore (IN); Bidisha Mondal, Syracuse, NY (US); Yash Agarwal, Bangalore (IN)

(73) Assignee: Intuit Inc., Mountain View, CA (US)

( * ) Notice: Subject to any disclaimer, the term of this patent is extended or adjusted under 35 U.S.C. 154(b) by 131 days.

(21) Appl. No.: 18/394,156

(22) Filed: Dec. 22, 2023

(65) Prior Publication Data

US 2025/0208881 A1    Jun. 26, 2025

(51) Int. Cl.
*G06F 9/44* (2018.01)
*G06F 9/445* (2018.01)
*G06F 9/451* (2018.01)

(52) U.S. Cl.
CPC .......... *G06F 9/44505* (2013.01); *G06F 9/453* (2018.02)

(58) Field of Classification Search
CPC .............................. G06F 9/44505; G06F 9/453
See application file for complete search history.

(56) References Cited

U.S. PATENT DOCUMENTS

| | | | |
|---|---|---|---|
| 2005/0187912 A1* | 8/2005 | Matsa | G06F 9/44505 |
| 2009/0106546 A1* | 4/2009 | Weichel | G06F 9/44505 |
| | | | 713/100 |
| 2017/0318124 A1* | 11/2017 | Webb | H04L 41/0846 |

* cited by examiner

*Primary Examiner* — Jaweed A Abbaszadeh
*Assistant Examiner* — Ayman Fatima
(74) *Attorney, Agent, or Firm* — Patterson + Sheridan, LLP (57) ABSTRACT

A method for automated workflow configuration assistance. Embodiments include receiving configuration data specifying a first condition of a workflow and a second condition of the workflow that depends on the first condition. Embodiments include generating a sequence of numerical values that indicate whether each of a set of possible values associated with the second condition is consistent with the first condition. Embodiments include determining, based on the sequence of numerical values, that the second condition is incompatible with the first condition or redundant of the first condition. Embodiments include, prior to configuring a software application based on the configuration data, providing output via a user interface indicating that the second condition is incompatible with the first condition or redundant of the first condition. Embodiments include receiving corrected configuration data via the user interface after providing the output and configuring the software application based on the corrected configuration data.

16 Claims, 6 Drawing Sheets

COMPILER AND RECOMMENDATION ENGINE FOR MULTI-CONDITION WORKFLOW CONFIGURATION

Aspects of the present disclosure relate to automated configuration assistance for multi-condition workflows in software applications. In particular, embodiments involve a compiler and recommendation engine for automatically validating workflow configuration data in an efficient manner in real-time and generating alerts and/or configuration recommendations as appropriate based on the validation.

BACKGROUND

Every year millions of people around the world utilize software applications to assist with countless aspects of life. Many software applications allow users to configure workflows by which certain actions are taken under certain conditions. For example, a software application may provide automation functionality, and a user may configure such automation functionality by specifying conditions under which automated actions are to be performed.

Existing techniques for workflow configuration generally involve providing a user interface by which a user enters workflow configuration data. However, with such existing techniques, errors in the configuration data entered via a user interface may lead to erroneous outcomes or application failures. Configuration errors become increasingly likely in more complex workflows, such as those involving multiple (e.g., nested) conditions. In these cases, it can be challenging to ensure that incompatible and/or redundant conditions are not defined in configuration data. The computing resource costs associated with such configuration errors may be high, such as including processing, memory, and/or network resource utilization associated with evaluating problematic conditions, recovering from application errors, and handling the correction of errors when identified by a user. Additionally, such configuration errors result in a software application not functioning correctly and providing a poor user experience.

Therefore, there is a need for improved techniques for workflow configuration in software applications, particularly for complex workflows that involve multiple conditions.

BRIEF SUMMARY

Aspects and advantages of embodiments of the present disclosure will be set forth in part in the following description, or may be learned from the description, or may be learned through practice of the embodiments.

A method for automated workflow configuration assistance includes: receiving, via a user interface, configuration data specifying: a first condition of a workflow; and a second condition of the workflow that depends on the first condition; generating a sequence of numerical values that indicate whether each value of a set of possible values associated with the second condition is consistent with the first condition; determining, based on the sequence of numerical values, that the second condition is incompatible with the first condition or redundant of the first condition; prior to configuring a software application based on the configuration data, providing output via the user interface, based on the determining, indicating that the second condition is incompatible with the first condition or redundant of the first condition; receiving corrected configuration data via the user interface after providing the output; and configuring the software application based on the corrected configuration data.

Further embodiments include a non-transitory computer-readable storage medium storing instructions that, when executed by a computer system, cause the computer system to perform the method set forth above. Further embodiments include a system comprising at least one memory and at least one processor configured to perform the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure relate to automated assistance with configuration of workflows in software applications.

A workflow in a software application may include one or more conditions and one or more actions, such as automation logic that causes certain actions to be performed when certain conditions are met. Conventional techniques for configuring workflows in software applications have a variety of drawbacks. For example, providing a mechanism for a user to enter workflow configuration data without providing any automated validation of the configuration data often results in erroneous workflow configurations, leading to incorrect functionality, application errors, and wasted computing resources. These problems are particularly pronounced in applications that support complex workflows, such as workflows having multiple conditions (e.g., which may be nested or otherwise dependent on one another). In such applications, the possibility of incorrect configuration becomes increasingly likely as the complexity of workflows grows, and the functional issues and wasted resources resulting from incorrectly configured workflows become more pronounced as complexity increases.

One potential solution is to automatically validate all configuration data using a brute force approach, such as checking all possible values for compatibility and/or redundancy. While this approach may prevent incorrect workflow configurations, it requires large amounts of computing resource utilization, particularly for complex workflows involving multiple conditions. For example, if configuration data indicates multiple nested conditions, a brute force technique for validating such configuration data would require confirming that every possible value associated with each condition is consistent with values specified by other conditions in the hierarchy. Such an approach would be inefficient and could not be used to validate configuration data in real-time (e.g., at the time the user is providing the configuration data) due to performance concerns.

Embodiments of the present disclosure overcome these problems with existing and alternative techniques through a particular process by which workflow configuration data is automatically validated in an efficient manner based on strategically selected data points and configuration recommendations are generated and provided in real-time. For example, rather than allowing a software application to be configured based on workflow configuration data that has not been validated, a configuration assistance engine automatically validates user-provided workflow configuration data and provides feedback via a user interface at configuration time alerting the user to problematic configuration data and recommending alternative correct configurations, as described in more detail below with respect to FIGS. 1-3.

Rather than performing brute force validation of all possible values associated with workflow configurations, embodiments described herein involve identifying key data points such as endpoints of value ranges and performing a resource-efficient validation based on those key data points. In certain embodiments, as described in more detail below with respect to FIG. 4, numerical sequences (e.g., arrays) are determined based on evaluating endpoints of value ranges for consistency within a multi-condition workflow configuration, and these numerical sequences are used to efficiently identify conditions that are inconsistent (e.g., with respect to higher-level conditions) or redundant, as well as to identify correct configuration values to automatically recommend via a user interface.

Once workflow configuration data is successfully validated, such as after alerting a user to incorrect configuration data and providing configuration recommendations, the validated workflow configuration data may then be used to configure the software application. For example, the software application may be configured to perform the workflow, which may involve performing one or more particular actions specified in the workflow when one or more conditions specified in the workflow are detected.

Techniques described herein provide multiple technical improvements over existing techniques for configuration of workflows in software applications. For example, as compared to existing techniques that provide no validation of workflow configuration data, embodiments of the present disclosure are able to automatically detect incorrect and/or redundant configuration values prior to configuring a software application based on such flawed configuration data, and allow alerts to be automatically generated at configuration time so that a user can correct any identified configuration issues. Thus, techniques described herein avoid the incorrect functionality, application errors, and/or wasted computing resource utilization that would otherwise occur as a result of configuring a software application using erroneous configuration data. Furthermore, techniques described herein allow recommended configuration values to be automatically determined and provided to a user in real-time to assist with workflow configuration, thereby further improving the configuration process and further reducing the likelihood of erroneous configuration and accompanying problems.

Additionally, as compared to a brute force validation method that performs exhaustive validation of all possible values associated with each condition in a workflow, embodiments of the present disclosure provide a resource-efficient solution that involves identifying key data points such as endpoints of particular value ranges, and performing validation based on those key data points. Thus, while a brute force validation technique would not perform well for real-time validation of workflow configuration data at configuration time due to high amounts of computing resource utilization, embodiments of the present disclosure are highly performant and can be used at configuration time in order to provide dynamic configuration assistance with reduced computing resource utilization. Experimental results indicate that while brute force validation techniques can be completed in at best $O(n \log(n))$ time, techniques described herein can be completed in at worst $O(n)$ time. These performance gains become increasingly significant as the complexity of workflow configurations increases, such as due to the inclusion of multiple conditions.

The ability to efficiently perform validation on workflow configurations and provide real-time alerts and recommendations at configuration time according to techniques described herein allows workflow configuration errors to be identified and corrected before a software application is configured with such erroneous configuration values, thereby improving the functioning of the software application and improving the functioning of computing devices involved (e.g., through reduced resource utilization as a result of the efficient validation process and the avoidance of errors that affect the functioning of the computer).

Example Computing Environment for Automated Workflow Configuration Assistance

Figure 1:
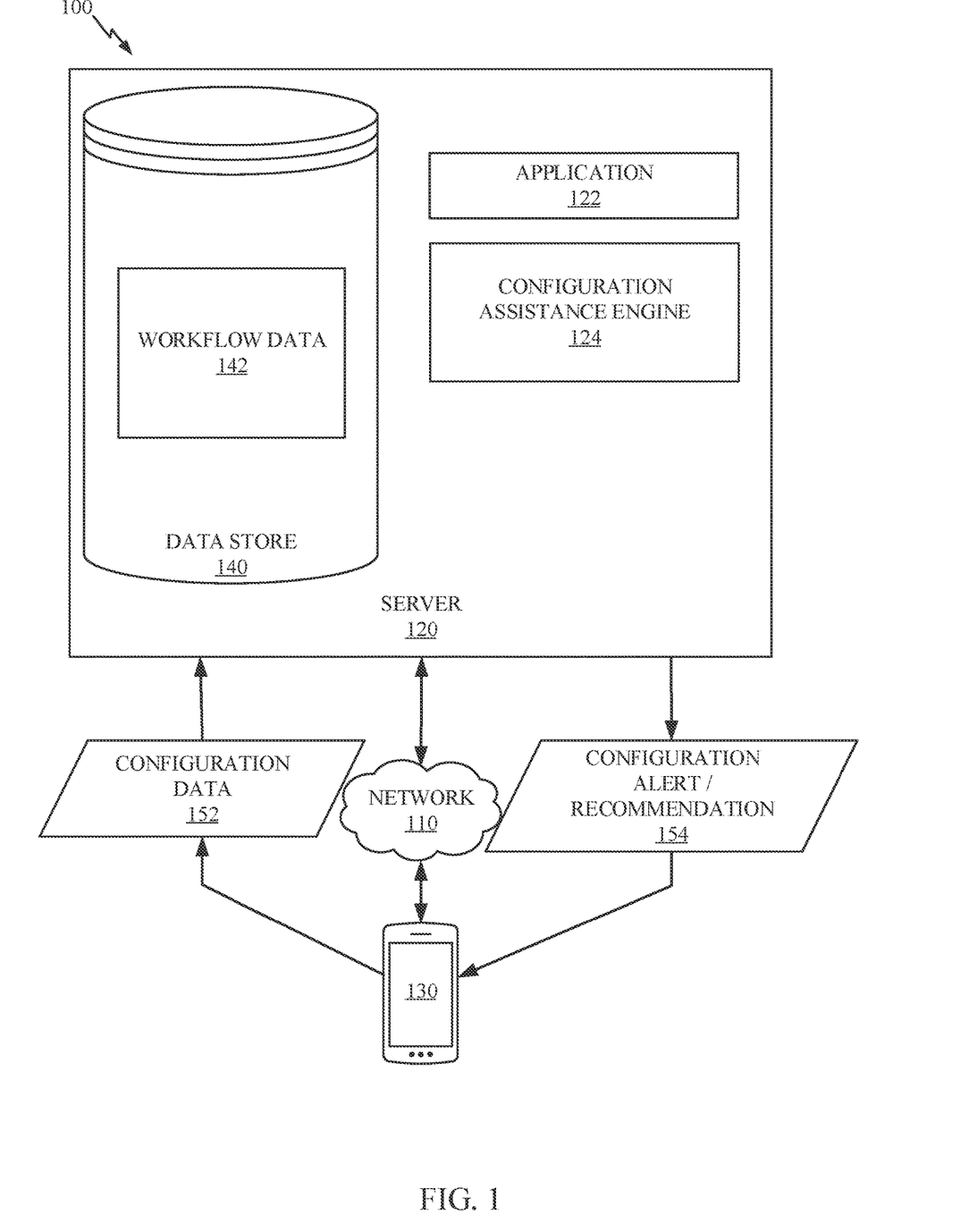
FIG. 1 depicts an example computing environment including components related to automated workflow configuration assistance according to embodiments of the present disclosure.

FIG. 1 illustrates an example computing environment 100 for automated workflow assistance according to embodiments of the present disclosure.

Computing environment 100 includes a server 120 and a client 130 connected over network 110. Network 110 may be representative of any type of connection over which data may be transmitted, such as a wide area network (WAN), local area network (LAN), cellular data network, and/or the like.

Server 120 includes an application 122, which generally represents a computing application that users interacts with over network 110, such as via computing devices (e.g., a user may interact with application 122 via client 130). In some embodiments, application 122 is accessed via a user interface associated with client 130.

According to one embodiment, application 122 is an electronic financial accounting system that assists users in book-keeping or other financial accounting practices. Additionally, or alternatively, the financial management system can manage one or more of tax return preparation, banking, investments, loans, credit cards, real estate investments, retirement planning, bill pay, and budgeting. In such an embodiment, workflows described herein may relate to automatically performing actions (e.g., prompting a particular individual for approval) upon the occurrence of certain conditions related to financial management (e.g., when an invoice is created within the software application that has an amount over a threshold). In other embodiments, application 122 provides other, non-financial functionality, and involves workflows that do not necessarily relate to finances. Generally, application 122 allows users to configure workflows in which particular actions are automatically performed upon the occurrence of particular conditions. Workflows may also relate to filtering or searching through a data set, such as specifying conditions (e.g., nested or otherwise) under which results should be displayed. Application 122 can be a standalone system, or can be integrated with other software or service products provided by a service provider.

Data store 140 generally represents a data storage entity such as a database or repository that stores data relating to application 122 and/or configuration assistance engine 124, including workflow data 142. Workflow data 142 generally includes data related to workflows configured via application 122, such as with the assistance of configuration assistance engine 124. For example, workflow data 142 may indications of conditions and actions that are to be performed based on the conditions, such as in a form that allows the conditions to be evaluated as events occur in order to determine whether to perform actions.

A configuration assistance engine 124 generally provides functionality related to dynamically assisting with workflow configuration, such as performing validation on workflow configuration data and generating configuration recommendations as appropriate. While shown separately, some or all of the functionality described herein with respect to configuration assistance engine 124 may alternatively be part of application 122 and/or may be implemented by one or more additional components.

In an example, as described in more detail below with respect to FIG. 2, a user may interact with a user interface (e.g., via client 130) in order to configure a workflow for application 122, and the resulting configuration data 152 may be provided to server 120. Configuration data 152 may specify one or more conditions and/or one or more actions. It is noted that configuration data 152 may include all or part of a workflow configuration. For example, configuration data 152 may represent an intermediate state of a workflow configuration that is processed for validation before the workflow is further configured.

Configuration assistance engine 124 may then perform an efficient validation of configuration data 152 and, if a configuration issue is detected, may generate a configuration alert and/or recommendation 154 (e.g., indicating the configuration issue and/or recommending one or more correct configuration values). As described in more detail below with respect to FIG. 3, configuration assistance engine 124 may include one or more components that perform one or more aspects of functionality described herein. As described in more detail below with respect to FIG. 4, configuration assistance engine 124 may generate one or more sequences of numerical values based on key data points (e.g., endpoints of value ranges) related to conditions specified in configuration data 152, and may perform validation and/or recommendation generation in a resource-efficient manner based on these numerical values.

A configuration alert and/or recommendation 154 may be provided to the user via the user interface (e.g., the configuration alert and/or recommendation 154 may be sent to client 130 and displayed via the user interface on client 130). An example of a configuration alert and/or recommendation 154 is described below with respect to FIG. 2.

In alternative embodiments, all components described herein may be implemented on a single device or on more or fewer devices than those shown.

Example User Interface Screen

Figure 2:
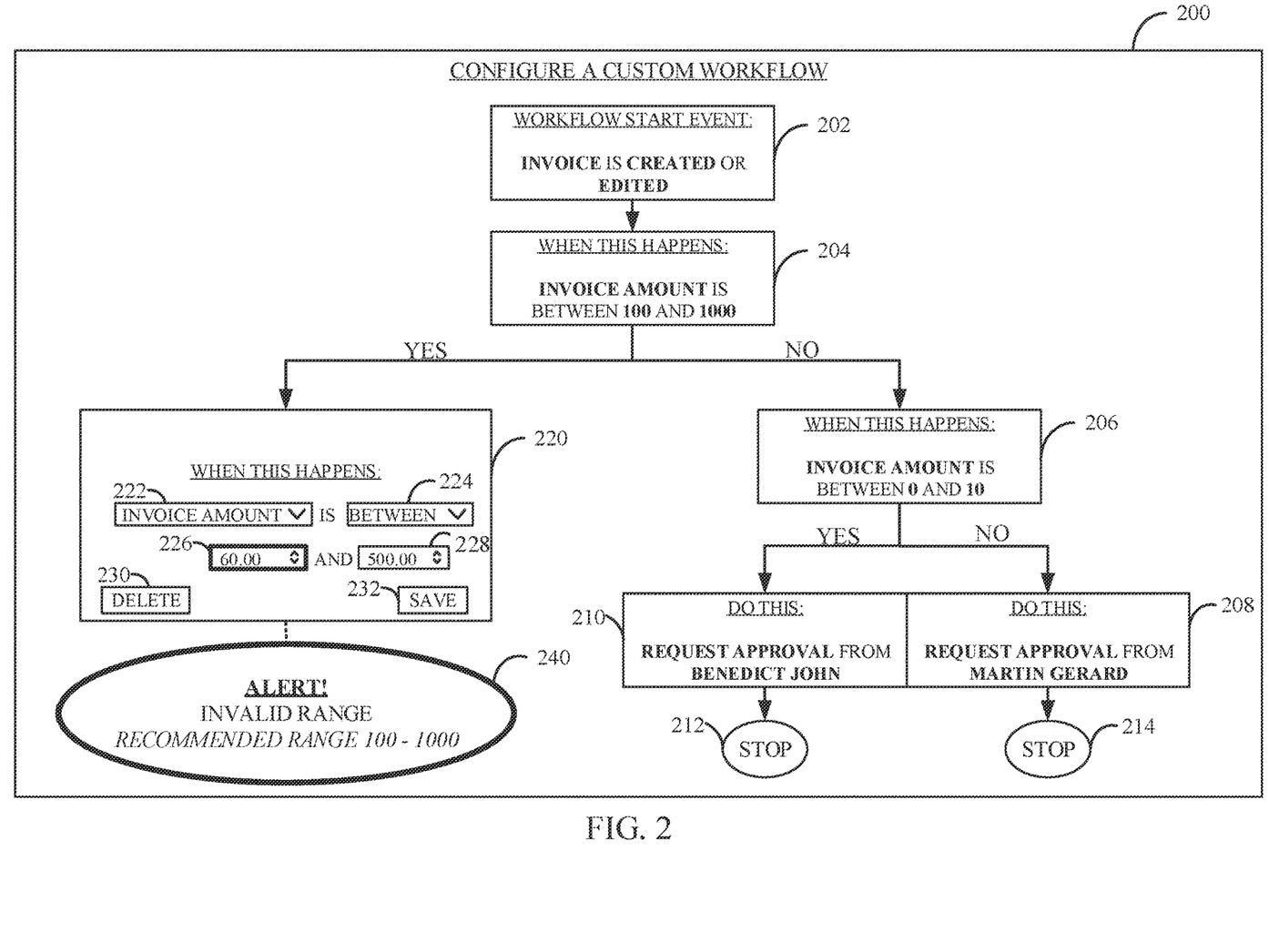
FIG. 2 depicts an example user interface screen relating to automated workflow configuration assistance according to embodiments of the present disclosure.

FIG. 2 illustrates an example user interface screen 200 related to automated workflow configuration assistance according to embodiments of the present disclosure. For example, user interface screen 200 may represent a screen of application 122 of FIG. 1 accessed via a user interface displayed on client 130 of FIG. 1. Generally, user interface screen 200 provides user interface controls by which a user is enabled to configure a custom workflow. In an example, user interface screen 200 provides drag and drop functionality, such as allowing a user to drag condition elements and action elements (e.g., from a list or section of the user interface that is not shown) onto a canvas, or otherwise allows the user to specify conditions, actions, and relationships between such conditions and actions.

In the depicted example, a workflow start event 202 (e.g., which may be an example of a condition) has been configured, indicating that the workflow begins when an invoice is created or edited. Following the workflow start event 202, another condition 204 has been configured indicating an invoice amount between 100 and 1000, and a "yes" path and "no" path for condition 204 are defined. The yes path for condition 204 indicates how the workflow should proceed when condition 204 is satisfied (e.g., when an invoice amount is between 100 and 1000), and the no path for condition 204 indicates how the workflow should proceed when condition 204 is not satisfied (e.g., when an invoice amount is not between 100 and 1000). Validation of condition 204 is described below with respect to FIG. 4.

For the no path of condition 204, another condition 206 has been configured, indicating an invoice amount between 0 and 10. The yes path for condition 206 includes an action 210, indicating that approval should be requested from a particular individual (Benedict John). The no path for condition 206 includes another action 208, indicating that approval should be requested from a different individual (Martin Gerard). Actions 210 and 212 are each followed in the workflow by stop actions 212 and 214, indicating that the workflow ends. In alternative configurations (not shown), an action may be followed by another action or condition.

For the yes path of condition 204, a condition 220 is currently being configured in the depicted example. Via controls 222, 224, 226, and 228, the user has selected that an invoice amount should be between 60.00 and 500.00. Controls 230 and 232 also allow the user to, respectively, delete or save condition 220.

According to embodiments described herein, condition 220 is validated in real-time, such as prior to finalizing condition 220 or otherwise configuring the application based on the workflow configuration data provided via user interface screen 200. For example, validation may be performed after the user enters one or more of the values in condition 220 and/or after the user selects control 232 to save condition 220.

An alert/recommendation 240 if displayed via user interface screen 200 indicating that a configuration issue has been detected and recommending a valid configuration. For example, alert/recommendation 240 may be displayed upon determining that the invoice amount range of 60-500 indicated in condition 220 is inconsistent with the invoice amount range of 100-1000 indicated in condition 204, upon which condition 220 depends (e.g., the range 60-500 includes one or more values that are outside the range 100-1000). Alert/recommendation 240 further indicates a recommended range of 100-1000, which is the only valid range within the yes path of condition 204. Determination of the incorrect configuration data and the configuration recommendation in a resource-efficient manner are described in more detail below with respect to FIGS. 3 and 4.

Providing alert/recommendation 240 via user interface screen 200 in real-time while the user is configuring the workflow allows configuration issues to be identified and prevented before being saved or otherwise used to configure the software application, and at a time when such configuration issues can be efficiently corrected without waste of computing resources or time.

The conditions and actions described herein are included as examples, and many other types of conditions and actions are possible. For example, conditions may relate to geographic locations, occupations, categories, statuses, values, performance metrics, security conditions, sensor data, and/or any other number of variables, whether related to invoices or some other type of workflow.

It is noted that user interface screen 200 is included as an example, and other types of user interface screens and/or methods of receiving workflow configuration data and providing alerts and/or recommendations may alternatively be employed using techniques described herein.

Example Computing Components

Figure 3:
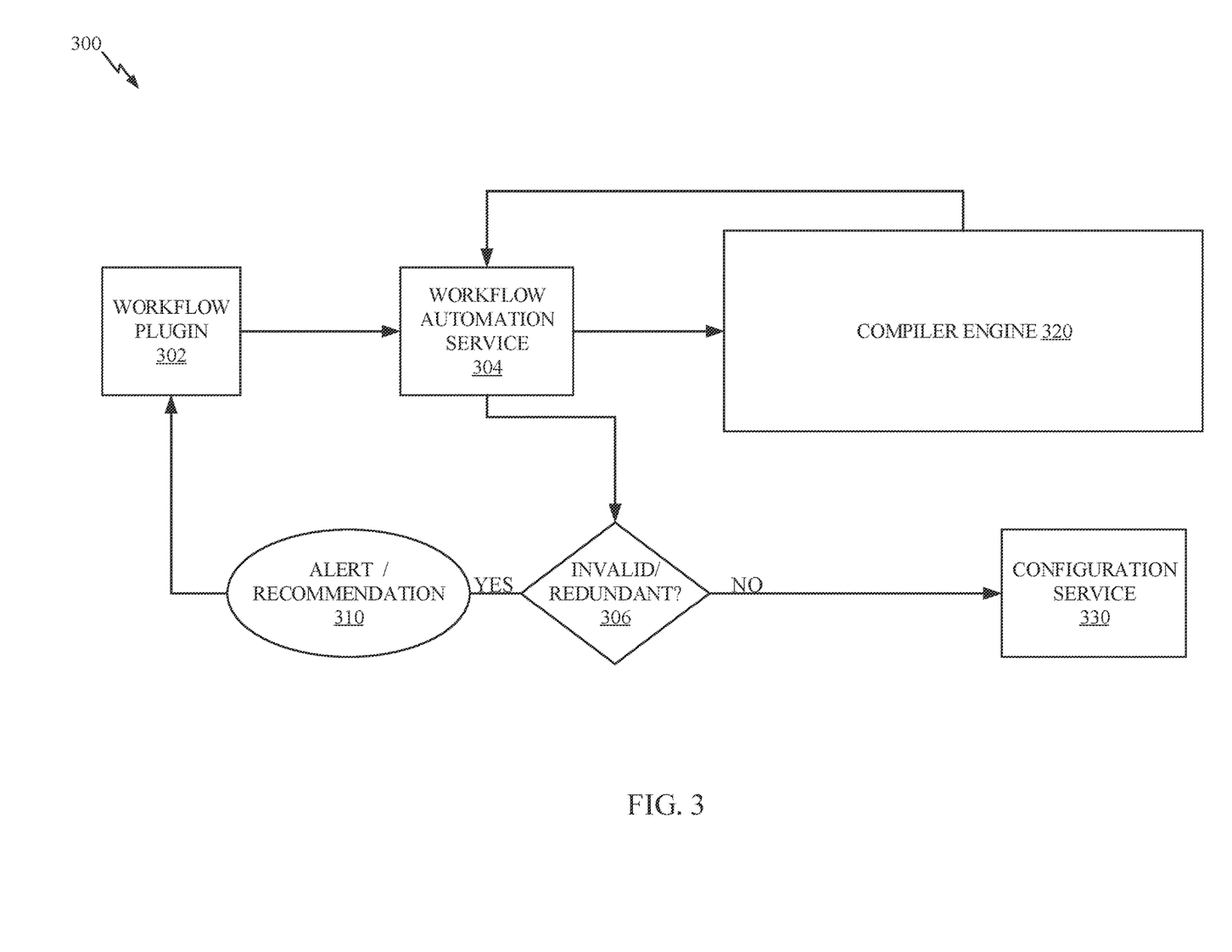
FIG. 3 is an illustration of example components of an automated configuration assistance engine according to embodiments of the present disclosure.

FIG. 3 is an illustration 300 of example components related to configuration assistance engine 124 of FIG. 1. For example, compiler engine 320 may represent a component of configuration assistance engine 124 of FIG. 1, and aspects of functionality described with respect to illustration 300 may be performed by configuration assistance engine 124 of FIG. 1.

Workflow plugin 302 generally represents a component that expands the functionality of a software application (e.g., application 122 of FIG. 1) to include workflow-related functionality described herein. For example, workflow plugin 302 may be installed within application 122 to enable application 122 to provide automated assistance related to configuration of multi-condition workflows as described herein. The use of a plugin is an example implementation, and other implementations are possible.

Workflow plugin 302 provides input to a workflow automation service 304, which generally orchestrates the automation of workflows according to configuration data provided by users, such as ensuring validity and non-redundancy of configuration data (e.g., through interaction with compiler engine 320) and, depending on whether the configuration data is valid and non-redundant, providing the configuration data to a configuration service 330 for configuring the software application or, otherwise, providing an alert/recommendation 310 in response to workflow plugin 302. For example, workflow automation service 304 may provide the configuration data (e.g., provided by a user as described above with respect to FIG. 2) to compiler engine 320, and compiler engine 320 may determine whether the configuration data includes any incorrect or redundant conditions. The compiler engine 320 may also determine configuration recommendations to provide along with any indications of incorrect or redundant conditions. The operation of compiler engine 320 is described in more detail blow with respect to examples depicted in FIG. 4.

Based on the output from compiler engine 320, workflow automation service 304 determines at step 306 whether the configuration data is invalid or redundant. If the configuration data is neither invalid nor redundant, the configuration data is provided to configuration service 330, which may configure the application based on the configuration data, such as enabling the workflow to be performed by the application. If the configuration data is invalid or redundant, an alert/recommendation 310 may be provided to workflow plugin 302, which may cause the alert/recommendation 310 to be displayed via a user interface (e.g., as described above with respect to FIG. 2).

Figure 4:
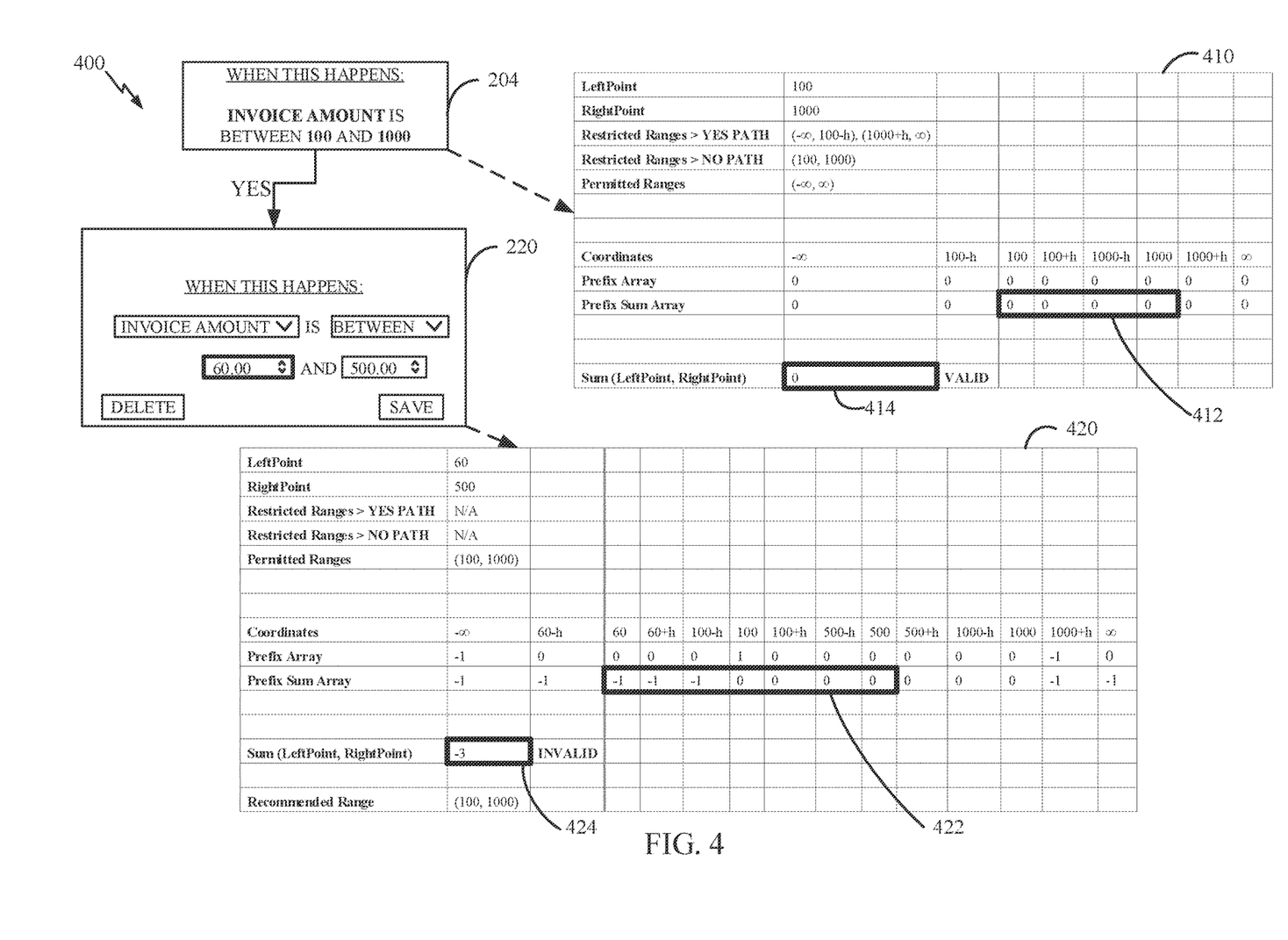
FIG. 4 depicts an example resource efficient process for automated workflow configuration assistance according to embodiments of the present disclosure.

Example Resource-Efficient Techniques for Automated Workflow Configuration Assistance FIG. 4 is an illustration 400 of example resource-efficient techniques for automated workflow configuration assistance as described herein. Illustration 400 includes conditions 204 and 220 of FIG. 2, and depicts examples of performing validation and/or recommendation generation with respect to these conditions.

A table 410 represents the results of processing by a workflow configuration assistance engine, such as configuration assistance engine 124 of FIG. 4, to validate condition 204. Table 410 indicates that the LeftPoint of condition 204 is 100 and the RightPoint of condition 204 is 1000 (e.g., because condition 204 indicates that the invoice amount is between 100 and 1000).

Table 410 further indicates that the restricted ranges for the yes path of condition 204 are $(-\infty, 100-h)$ and $(1000+h, \infty)$ because when condition 204 is true the invoice amount is between 100 and 1000, which is the range (100, 1000), and any values outside of that range are restricted. The symbol $\infty$ stands for infinity, and the variable h stands for an infinitesimal number having a quantity that is closer to 0 than any standard real number, but that is not 0. Thus, the range $(-\infty, 100-h)$ essentially includes all numbers less than 100, and the range $(1000+h, \infty)$ essentially includes all numbers greater than 1000. The restricted range for the no path of condition 204 is (100, 1000) because when condition 204 is not true the invoice amount is not between 100 and 1000, which is the range (100, 1000), and any values inside of that range are restricted. The permitted range within which condition 204 may operate is $(-\infty, \infty)$, which includes all numbers, because there are no conditions above condition 204 in the hierarchy of the workflow that restrict the value range.

In order to perform validation on condition 204, the endpoints of applicable value ranges may be identified and used to define coordinates. In this case, the applicable value range is (100, 1000), which is determined based on the values specified in condition 204. The endpoints of this value range are 100 and 1000. Furthermore, $-\infty$ and $\infty$ are always included as coordinates. For example, the key data points for any condition may include $-\infty$ and $\infty$ and every number that is directly indicated in the condition and in any parent conditions of the condition (e.g., the endpoints of any ranges in the condition and/or parent condition(s)), as well as each of those numbers minus h and each of those numbers +h. Thus, the key data points for condition 204 may include $-\infty$, 100−h, 100, 100+h, 1000−h, 1000, 1000+h, and $\infty$, which may be used as coordinates of a prefix array, as indicated in table 410.

According to certain embodiments, a prefix array is generated for validation of a condition, and includes values corresponding to the coordinates (e.g., key data points) for the condition. The values in the prefix array are populated based on determining whether each of the coordinates falls within the permitted range(s) for the condition. For example, in table 410, the prefix array {0, 0, 0, 0, 0, 0, 0, 0} indicates whether each of coordinates $-\infty$, 100−h, 100, 100+h, 1000−h, 1000, 1000+h, and $\infty$ falls within the permitted range of condition 204, which is $(-\infty, \infty)$.

For example, generating a prefix array for a condition may involve adding a value of negative one for every coordinate that begins a range that is not permitted for the condition, adding a one for every coordinate that immediately follows the end of a range that is not permitted for the condition, and adding zero values for every other coordinate. Thus, for condition 204, the prefix array in table 410 is generated by adding zero values for all coordinates, since all of the coordinates fall within the permitted range of $(-\infty, \infty)$ and none of the coordinates fall within a restricted range.

A prefix sum array is then generated based on the prefix array, where the value for each coordinate in the prefix sum array is equal to the sum of the corresponding value for that coordinate in the prefix array and all previous values in the prefix array. For example, the prefix sum array may be described as maintaining a rolling total of the prefix array at each subsequent coordinate. For example, if the prefix array is defined as $\{p_0, p_1, \ldots p_n\}$ and the prefix sum array may be defined as $\{ps_0, ps_1, \ldots ps_n\}$, then $ps_i = \sum_{k=0}^{i} p_k$.

In the example depicted in table 410, all of the values in the prefix sum array are 0, because all of the values in the prefix array are 0 (e.g., the rolling total at every subsequent coordinate in the prefix array is 0).

According to certain embodiments, in order to determine whether condition 204 is valid, a sum of the values in the prefix sum array for the coordinates corresponding to the range (LeftPoint, RightPoint) is determined. For example, in table 410, LeftPoint is 100 and RightPoint is 1000 (e.g., these are the endpoints of the range specified in the condition). Thus, a sum of the values 412 from the prefix sum array that correspond the coordinates in this range (100, 100+h, 1000−h, 1000) is determined. In the example depicted in table 410, this sum 414 is 0, because all of values 412 are 0.

In certain embodiments, a sum of 0 means that the condition is valid, while a negative sum means that the condition invalid. In this case, because sum 414 is 0, condition 204 is determined to be valid.

After a condition is determined to be valid, the prefix sum array may be further used to determine whether the condition is redundant. For example, the number of zero values in the prefix sum array for the coordinates corresponding to the range (LeftPoint, RightPoint), which in this case includes values 412, is compared to the total number of zero values in the prefix sum array. If the two numbers are equal (e.g., meaning that the range specified in the condition includes all of the valid points of the parent range) then the condition is redundant. In the example depicted in table 410, the number of zeroes in values 412 (5) is less than the total number of zeroes in the prefix sum array (8), so condition 204 is determined not to be redundant.

Having determined that condition 204 is valid and non-redundant, the configuration assistance engine may then process condition 220 in a similar manner. Table 420 illustrates the process of validating condition 220. In table 420, LeftPoint is equal to 60 and RightPoint is equal to 500 because the range specified in condition 220 is an invoice amount between 60 and 500. A yes path and a no path have not yet been specified for condition 220 (e.g., because the user is still in the process of configuring condition 220), so there are no restricted ranges indicated yet in table 420 for the yes path or no path of condition 220. In table 420, the permitted range for condition 220 is (100, 1000) because condition 220 depends upon condition 204 (e.g., condition 220 is on the yes path for condition 204) and condition 204 indicates an invoice amount between 100 and 1000. Thus, only values in the range of (100, 1000) are valid for condition 220.

The coordinates for the prefix array in table 420 are determined based on the relevant value ranges for condition 220. In this case, the applicable value ranges are (100, 1000) and (60, 500), which are determined based on the values specified in condition 204 and condition 220. The endpoints of these value ranges are 100 and 1000 as well as 60 and 500. Furthermore, $-\infty$ and $\infty$ are always included as coordinates. For example, the key data points for any condition may include $-\infty$ and $\infty$ and every number that is directly indicated in the condition and in any parent conditions of the condition (e.g., the endpoints of any ranges in the condition and/or parent condition(s)), as well as each of those numbers minus h and each of those numbers +h. Thus, the key data points for condition 220 may include $-\infty$, 60−h, 60, 60+h, 100−h, 100, 100+h, 500−h, 500, 500+h, 1000−h, 1000, 1000+h, and $\infty$, which may be used as coordinates of a prefix array, as indicated in table 420.

According to certain embodiments, a prefix array is generated for validation of condition 220, and includes values corresponding to the coordinates (e.g., key data points) for condition 420. For example, in table 420, the prefix array $\{-1, 0, 0, 0, 0, 1, 0, 0, 0, 0, 0, 0, -1, 0\}$ indicates whether each of coordinates −0, 60−h, 60, 60+h, 100−h, 100, 100+h, 500−h, 500, 500+h, 1000−h, 1000, 1000+h, and co falls within the permitted range of condition 220, which is (100, 1000).

For example, generating a prefix array for a condition may involve adding a value of negative one for every coordinate that begins a range that is not permitted for the condition, adding a one for every coordinate that immediately follows the end of a range that is not permitted for the condition, and adding zero values for every other coordinate. Thus, for condition 220, the prefix array in table 420 is generated by adding a −1 value for the coordinate $-\infty$ because $-\infty$ is the beginning of a range (−0, 100−h) that is not permitted for condition 220, adding a 1 value for the for the coordinate 100 because 100 is the coordinate immediately following the end of a range (−0, 100−h) that is not permitted for condition 220, adding a −1 value for the coordinate 1000+h because 1000+h is the beginning of a range (1000+h, $\infty$) that is not permitted for condition 220, and adding 0 values for all other coordinates. It is noted that a 1 value cannot be added for the coordinate immediately following the end of the restricted range (1000+h, $\infty$) because there is no coordinate beyond $\infty$.

A prefix sum array is then generated based on the prefix array, where the value for each coordinate in the prefix sum array is equal to the sum of the corresponding value for that coordinate in the prefix array and all previous values in the prefix array. For example, the prefix sum array may be described as maintaining a rolling total of the prefix array at each subsequent coordinate. In the example depicted in table 420, the prefix sum array is $\{-1, -1, -1, -1, -1, 0, 0, 0, 0, 0, 0, 0, -1, -1\}$, which maintains a rolling total of the prefix array $\{-1, 0, 0, 0, 0, 1, 0, 0, 0, 0, 0, 0, -1, 0\}$.

The first value of the prefix sum array is −1 because the first value of the prefix array is −1. The second value of the prefix sum array is −1 because the sum of the first two values of the prefix array (−1+0) is −1. The third value of the prefix sum array is −1 because the sum of the first three values of the prefix array (−1+0+0) is −1. The fourth value of the prefix sum array is −1 because the sum of the first four values of the prefix array (−1+0+0+0) is −1. The fifth value of the prefix sum array is −1 because the sum of the first five values of the prefix array (−1+0+0+0+0) is −1. The sixth value of the prefix sum array is 0 because the sum of the first six values of the prefix array (−1+0+0+0+0+1) is 0. The seventh value of the prefix sum array is 0 because the sum of the first seven values of the prefix array (−1+0+0+0+0+1+0) is 0. The eight value of the prefix sum array is 0 because the sum of the first eight values of the prefix array (−1+0+0+0+0+1+0+0) is 0. The ninth value of the prefix sum array is 0 because the sum of the first nine values of the prefix array (−1+0+0+0+0+1+0+0+0) is 0. The tenth value of the prefix sum array is 0 because the sum of the first ten values of the prefix array (−1+0+0+0+0 +1+0+0+0) is 0. The eleventh value of the prefix sum array is 0 because the sum of the first eleven values of the prefix array (−1+0+0+0+0+ 1+0+0+0) is 0. The twelfth value of the prefix sum array is 0 because the sum of the first twelve values of the prefix array (−1+0+0+0 +0+1+0+0+0+0) is 0. The thirteenth value of the prefix sum array is −1 because the sum of the first thirteen values of the prefix array (−1+0+0+0+0+1+0+0+0+ 0+−1) is −1. The fourteenth value of the prefix sum array is −1 because the sum of the first fourteen values of the prefix array (−1+0+0+0+0+1+0+0+0+0+−1+0) is −1.

According to certain embodiments, in order to determine whether condition 220 is valid, a sum of the values in the prefix sum array for the coordinates corresponding to the range (LeftPoint, RightPoint) is determined. For example, in table 420, LeftPoint is 60 and RightPoint is 500 (e.g., these are the endpoints of the range specified in the condition). Thus, a sum of the values 422 from the prefix sum array that correspond the coordinates in this range (60, 60+h, 100−h, 100, 100+h, 500−h, 500) is determined. In the example depicted in table 420, this sum 424 is −3, because the sum of values 422 (including −1, −1, −1, 0, 0, 0, and 0) is −3.

In certain embodiments, a negative sum means that the condition invalid. In this case, because sum 424 is −3, condition 220 is determined to be invalid. There is no need to determine whether condition 220 is redundant, because it has been determined to be invalid.

After a condition is determined to be invalid, the prefix sum array may be further used to determine a recommended configuration. For example, the range that includes zero values in the prefix sum array may be determined as a recommended range. In table 420, the prefix sum array includes a stretch of zero values between coordinates 100 and 1000. Thus, the recommended range for condition 220 may be determined to be (100, 1000). An alert may be generated indicating that condition 220 is invalid, and the recommended range (100, 1000) may be provided along with the alert, as described above with respect to alert/ recommendation 240 of FIG. 2.

While no redundant condition is shown, alerts may also be generated for conditions determined to be redundant, and a recommendation for such a redundant condition may suggest selecting a non-exhaustive subset of the permitted range(s) for the condition.

While illustration 400 depicts an example of validating numerical conditions, a similar process may also be used to validate non-numerical conditions, such as conditions that specify lists, strings, or other non-numerical values and/or ranges. For example, coordinates for a list-based condition may include the first item and the last item in an ordered list of available items as well any specific items indicated in the condition and any parent conditions, along with the items immediately preceding and immediately following each of those specific items in the ordered list of available items. Similarly, coordinates for a string-based condition may include the first character and the last character in an ordered set of available characters as well any specific characters indicated in the condition and any parent conditions, along with the characters immediately preceding and immediately following each of those specific characters in the ordered list of available characters. For conditions that mix different types of values, such as numerical and non-numerical values, all applicable coordinates of different types may be included in a similar manner.

Otherwise, the process for confirming validity and non-redundancy of such conditions (e.g., non-numerical or mixed conditions) as well as determining recommended configurations as appropriate is performed in the same or a similar manner as that described above with respect to tables 410 and 420.

Using techniques described herein that rely only on key data points related to conditions and generate sequences of numbers based on such key data points (e.g., the prefix array and prefix sum array as described above) significantly reduces the amount of computing resource utilization as compared to brute force techniques that analyze every possible value for every condition in an exhaustive manner, particularly for workflows involving multiple conditions, and thus allow such techniques to be implemented in real-time as a user is configuring a workflow.

An application configured to perform a workflow as described herein (e.g., a workflow that has been efficiently validated at configuration time) may then perform one or more actions indicated in the workflow when one or more conditions specified in the workflow occur. For example, if the user corrected condition 220 to specify a valid range such as 100-200, and then specified a yes path for condition 220 to include an action of requesting approval from Elizabeth Lane, then the workflow would cause the application to perform that action (e.g., automatically requesting approval from Elizabeth Lane, such as via an email address, phone number, user interface, and/or the like) when an invoice is created or edited that specifies an invoice amount between 100 and 1000 and also between 100 and 200. Requesting approval from an individual is included as one example of an action, and many other types of actions may also be specified in workflows. For example, actions may include activating or deactivating software application features, initiating or terminating processes, controlling smart devices, generating alerts or messages, causing content to be displayed or hidden, deleting files, allowing or disallowing particular communications or other activities, performing an automated security or health check, opening a support ticket, initiating an automated or assisted support session, and/or the like. Conditions may, for example, include any types of conditions that specify particular values or ranges of values, whether numerical or non-numerical.

Example Method for Automated Workflow Configuration Assistance

Figure 5:
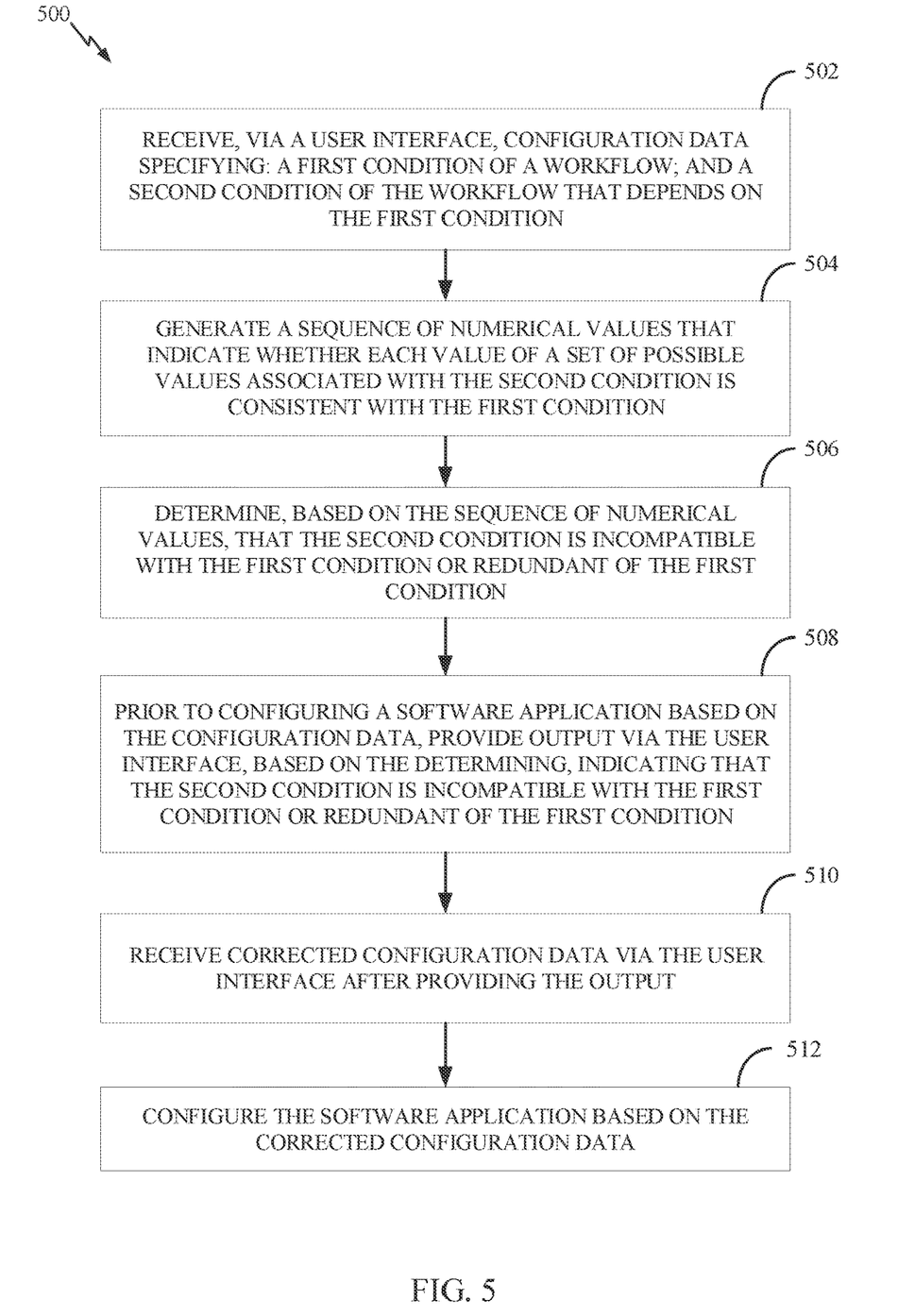
FIG. 5 depicts example operations related to automated workflow configuration assistance according to embodiments of the present disclosure.

FIG. 5 depicts example operations 500 related to automated workflow configuration assistance according to embodiments of the present disclosure. For example, operations 500 may be performed by one or more components described above with respect to computing environment 100 of FIG. 1.

Operations 500 begin at step 502, with receiving, via a user interface, configuration data specifying: a first condition of a workflow; and a second condition of the workflow that depends on the first condition.

Operations 500 continue at step 504, with generating a sequence of numerical values that indicate whether each value of a set of possible values associated with the second condition is consistent with the first condition. In some embodiments, the generating of the sequence of numerical values comprises adding numerical values to the sequence of numerical values that represent beginning points and ending points of value ranges in the set of possible values. For example, the value ranges may be determined based on the first condition and the second condition.

In some embodiments, the generating of the sequence of numerical values comprises adding a negative one value to the sequence of numerical values to represent a beginning point of a value range that does not comply with the first condition. In certain embodiments, the generating of the sequence of numerical values comprises adding a positive one value to the sequence of numerical values to represent a respective beginning point of a respective value range that immediately follows the value range that does not comply with the first condition. In some embodiments, the generating of the sequence of numerical values comprises adding zero values to the sequence of numerical values to represent points that are not beginning points of value ranges that do not comply with the first condition and are not respective beginning points of respective value ranges that immediately follow given value ranges that do not comply with the first condition.

In certain embodiments, the generating of the sequence of numerical values does not involve a brute force analysis of all possible values associated with second condition.

Certain embodiments involve generating a sum array that stores sums of subsets of the sequence of numerical values. For example, the determining, based on the sequence of numerical values, that the second condition is incompatible with the first condition or redundant of the first condition may be based on the sum array.

Operations 500 continue at step 506, with determining, based on the sequence of numerical values, that the second condition is incompatible with the first condition or redundant of the first condition.

Operations 500 continue at step 508, with, prior to configuring a software application based on the configuration data, providing output via the user interface, based on the determining, indicating that the second condition is incompatible with the first condition or redundant of the first condition.

Operations 500 continue at step 510, with receiving corrected configuration data via the user interface after providing the output.

In some embodiments, the corrected configuration data specifies: the first condition of the workflow; and a corrected second condition of the workflow that depends on the first condition, wherein the corrected second condition is not incompatible with the first condition and not redundant of the first condition.

Operations 500 continue at step 512, with configuring the software application based on the corrected configuration data.

Some embodiments further comprise, prior to the configuring of the software application based on the corrected configuration data, generating a new sequence of numerical values that indicate whether each value of a corresponding set of possible values associated with the corrected second condition is consistent with the first condition and determining, based on the new sequence of numerical values, that the corrected second condition is not incompatible with the first condition and not redundant of the first condition.

In certain embodiments, the corrected configuration data further specifies an action to be performed in the workflow when the corrected second condition is satisfied, and the configuring of the software application based on the corrected configuration data comprises configuring the software application to perform the action when the corrected second condition is satisfied.

Some embodiments further comprise determining, based on the sequence of numerical values, a configuration recommendation for the workflow. For example, the configuration recommendation may be provided via the user interface along with the output, and the corrected configuration data may be consistent with the configuration recommendation.

Example Computing Systems

Figure 6A:
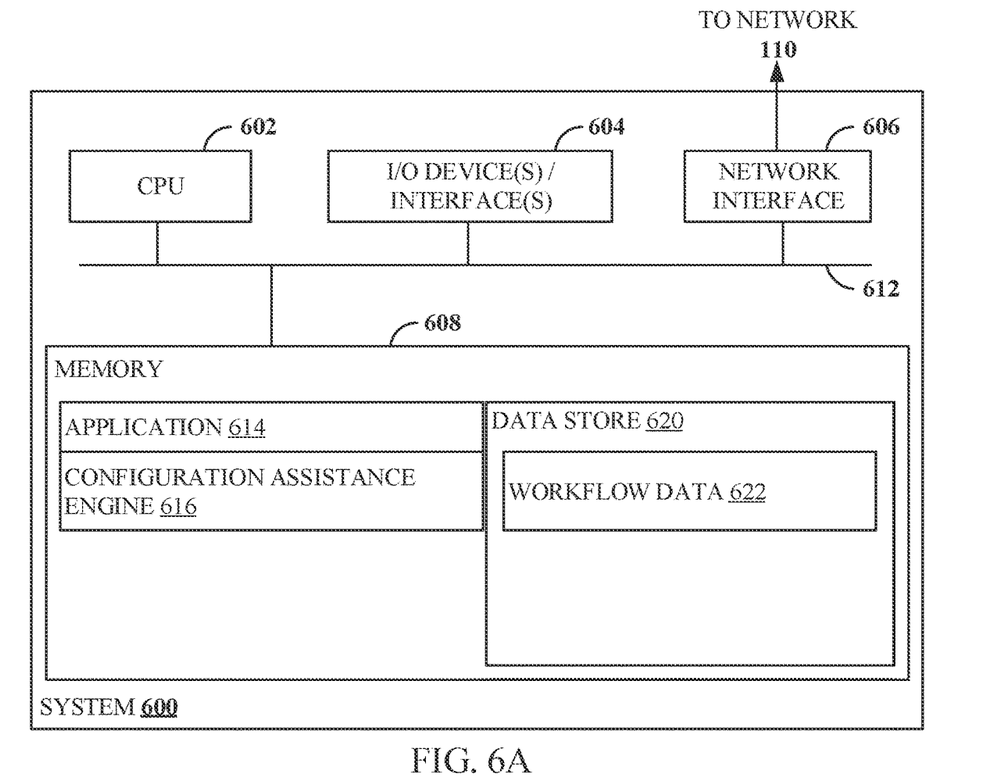
FIGS. 6A and 6B depict example processing systems related to automated workflow configuration assistance according to embodiments of the present disclosure.

FIG. 6A illustrates an example computing system 600 with which embodiments of the disclosure related to automated workflow configuration assistance may be implemented. For example, the computing system 600 may be representative of server 120 of FIG. 1.

The computing system 600 includes a central processing unit (CPU) 602, one or more I/O device interfaces 604 that may allow for the connection of various I/O devices 604 (e.g., keyboards, displays, mouse devices, pen input, etc.) to the computing system 600, a network interface 606, a memory 608, and an interconnect 612. It is contemplated that one or more components of the computing system 600 may be located remotely and accessed via a network 610. It is further contemplated that one or more components of the computing system 600 may include physical components or virtualized components.

The CPU 602 may retrieve and execute programming instructions stored in the memory 608. Similarly, the CPU 602 may retrieve and store application data residing in the memory 608. The interconnect 612 transmits programming instructions and application data, among the CPU 602, the I/O device interface 604, the network interface 606, the memory 608. The CPU 602 is included to be representative of a single CPU, multiple CPUs, a single CPU having multiple processing cores, and other arrangements.

Additionally, the memory 608 is included to be representative of a random access memory or the like. In some embodiments, the memory 608 may include a disk drive, solid state drive, or a collection of storage devices distributed across multiple storage systems. Although shown as a single unit, the memory 608 may be a combination of fixed and/or removable storage devices, such as fixed disc drives, removable memory cards or optical storage, network attached storage (NAS), or a storage area-network (SAN).

As shown, the memory 608 includes application 614, configuration assistance engine 616, and data store 620 including workflow data 622, which may be representative of application 122, configuration assistance engine 124, data store 140, and workflow data 142 of FIG. 1.

Figure 6B:
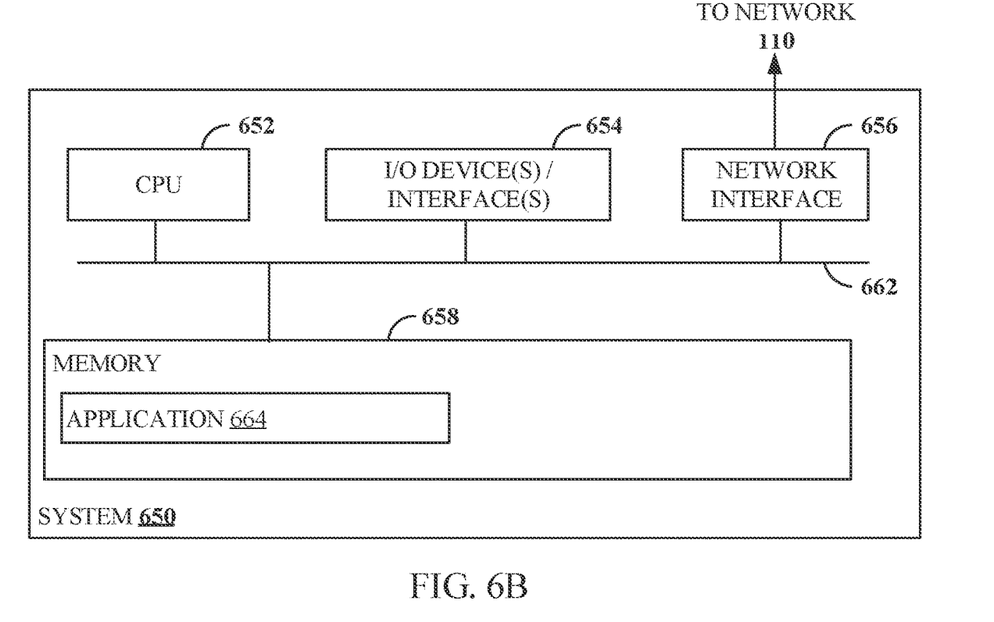

FIG. 6B illustrates an example computing system 650 with which embodiments of the system related to automatically recommending items for selection with a software application through machine learning may be implemented. For example, the computing system 650 may be representative of client 130 of FIG. 1.

The computing system 650 includes a central processing unit (CPU) 652, one or more I/O device interfaces 654 that may allow for the connection of various I/O devices 654 (e.g., keyboards, displays, mouse devices, pen input, etc.) to the computing system 650, a network interface 656, a memory 658, and an interconnect 660. It is contemplated that one or more components of the computing system 650 may be located remotely and accessed via a network 662. It is further contemplated that one or more components of the computing system 650 may include physical components or virtualized components.

The CPU 652 may retrieve and execute programming instructions stored in the memory 658. Similarly, the CPU 652 may retrieve and store application data residing in the memory 658. The interconnect 660 transmits programming instructions and application data, among the CPU 652, the I/O device interface 654, the network interface 656, the memory 658. The CPU 652 is included to be representative of a single CPU, multiple CPUs, a single CPU having multiple processing cores, and other arrangements.

Additionally, the memory 658 is included to be representative of a random access memory or the like. In some embodiments, the memory 658 may include a disk drive, solid state drive, or a collection of storage devices distributed across multiple storage systems. Although shown as a single unit, the memory 658 may be a combination of fixed and/or removable storage devices, such as fixed disc drives, removable memory cards or optical storage, network attached storage (NAS), or a storage area-network (SAN).

As shown, the memory 658 may include an application 664, such as a user-side application (e.g., comprising a user interface) discussed above with respect to client 130 of FIG. 1.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automated workflow configuration assistance, the method comprising:
    receiving, via a user interface, configuration data specifying:
        a first condition of a workflow; and
        a second condition of the workflow that depends on the first condition;
    generating a sequence of numerical values that indicate whether each value of a set of possible values associated with the second condition is consistent with the first condition, wherein the generating of the sequence of numerical values comprises adding numerical values to the sequence of numerical values that represent beginning points and ending points of value ranges in the set of possible values, wherein the value ranges are determined based on the first condition and the second condition, and wherein the generating of the sequence of numerical values comprises adding a negative one value to the sequence of numerical values to represent a beginning point of a value range that does not comply with the first condition;
    determining, based on the sequence of numerical values, that the second condition is incompatible with the first condition or redundant of the first condition;
    prior to configuring a software application based on the configuration data, providing output via the user interface, based on the determining, indicating that the second condition is incompatible with the first condition or redundant of the first condition;
    receiving corrected configuration data via the user interface after providing the output; and
    configuring the software application based on the corrected configuration data.

2. The method of claim 1, wherein the corrected configuration data specifies:
    the first condition of the workflow; and
    a corrected second condition of the workflow that depends on the first condition, wherein the corrected second condition is not incompatible with the first condition and not redundant of the first condition.

3. The method of claim 2, further comprising, prior to the configuring of the software application based on the corrected configuration data:
    generating a new sequence of numerical values that indicate whether each value of a corresponding set of possible values associated with the corrected second condition is consistent with the first condition; and
    determining, based on the new sequence of numerical values, that the corrected second condition is not incompatible with the first condition and not redundant of the first condition.

4. The method of claim 2, wherein the corrected configuration data further specifies an action to be performed in the workflow when the corrected second condition is satisfied, and wherein the configuring of the software application based on the corrected configuration data comprises configuring the software application to perform the action when the corrected second condition is satisfied.

5. The method of claim 1, further comprising:
determining, based on the sequence of numerical values, a configuration recommendation for the workflow; and
providing, via the user interface, the configuration recommendation along with the output, wherein the corrected configuration data is consistent with the configuration recommendation.

6. The method of claim 1, wherein the generating of the sequence of numerical values comprises adding a positive one value to the sequence of numerical values to represent a respective beginning point of a respective value range that complies with the first condition.

7. The method of claim 6, wherein the generating of the sequence of numerical values comprises adding zero values to the sequence of numerical values to represent points that are not beginning points of value ranges that do not comply with the first condition and are not respective beginning points of respective value ranges that immediately follow given value ranges that do not comply with the first condition.

8. The method of claim 7, further comprising generating a sum array that stores sums of subsets of the sequence of numerical values.

9. The method of claim 8, wherein the determining, based on the sequence of numerical values, that the second condition is incompatible with the first condition or redundant of the first condition is based on the sum array.

10. The method of claim 1, wherein the generating of the sequence of numerical values does not involve a brute force analysis of all possible values associated with second condition.

11. A system for automated workflow configuration assistance, comprising:
one or more processors; and
a memory storing instructions that, when executed by the one or more processors, cause the system to:
receive, via a user interface, configuration data specifying:
a first condition of a workflow; and
a second condition of the workflow that depends on the first condition;
generate a sequence of numerical values that indicate whether each value of a set of possible values associated with the second condition is consistent with the first condition, wherein the generating of the sequence of numerical values comprises adding numerical values to the sequence of numerical values that represent beginning points and ending points of value ranges in the set of possible values, wherein the value ranges are determined based on the first condition and the second condition, and wherein the generating of the sequence of numerical values comprises adding a negative one value to the sequence of numerical values to represent a beginning point of a value range that does not comply with the first condition;
determine, based on the sequence of numerical values, that the second condition is incompatible with the first condition or redundant of the first condition;
prior to configuring a software application based on the configuration data, provide output via the user interface, based on the determining, indicating that the second condition is incompatible with the first condition or redundant of the first condition;
receive corrected configuration data via the user interface after providing the output; and
configure the software application based on the corrected configuration data.

12. The system of claim 11, wherein the corrected configuration data specifies:
the first condition of the workflow; and
a corrected second condition of the workflow that depends on the first condition, wherein the corrected second condition is not incompatible with the first condition and not redundant of the first condition.

13. The system of claim 12, wherein the instructions, when executed by the one or more processors, further cause the system to, prior to the configuring of the software application based on the corrected configuration data:
generate a new sequence of numerical values that indicate whether each value of a corresponding set of possible values associated with the corrected second condition is consistent with the first condition; and
determine, based on the new sequence of numerical values, that the corrected second condition is not incompatible with the first condition and not redundant of the first condition.

14. The system of claim 12, wherein the corrected configuration data further specifies an action to be performed in the workflow when the corrected second condition is satisfied, and wherein the configuring of the software application based on the corrected configuration data comprises configuring the software application to perform the action when the corrected second condition is satisfied.

15. The system of claim 11, wherein the instructions, when executed by the one or more processors, further cause the system to:
determine, based on the sequence of numerical values, a configuration recommendation for the workflow; and
provide, via the user interface, the configuration recommendation along with the output, wherein the corrected configuration data is consistent with the configuration recommendation.

16. A non-transitory computer readable medium comprising instructions that, when executed by one or more processors of a computing system, cause the computing system to:
receive, via a user interface, configuration data specifying:
a first condition of a workflow; and
a second condition of the workflow that depends on the first condition;
generate a sequence of numerical values that indicate whether each value of a set of possible values associated with the second condition is consistent with the first condition, wherein the generating of the sequence of numerical values comprises adding numerical values to the sequence of numerical values that represent beginning points and ending points of value ranges in the set of possible values, wherein the value ranges are determined based on the first condition and the second condition, and wherein the generating of the sequence of numerical values comprises adding a negative one value to the sequence of numerical values to represent a beginning point of a value range that does not comply with the first condition;
determine, based on the sequence of numerical values, that the second condition is incompatible with the first condition or redundant of the first condition;
prior to configuring a software application based on the configuration data, provide output via the user interface, based on the determining, indicating that the second condition is incompatible with the first condition or redundant of the first condition;
receive corrected configuration data via the user interface after providing the output; and
configure the software application based on the corrected configuration data.

\* \* \* \* \*